United States Patent [19]

Edelstein

[11] 4,335,516
[45] Jun. 22, 1982

[54] POWER DRIVEN MICROMETER

[75] Inventor: Arthur Edelstein, Jamaica, N.Y.

[73] Assignee: Oriel Corporation, Stamford, Conn.

[21] Appl. No.: 133,626

[22] Filed: Mar. 24, 1980

[51] Int. Cl.³ .............................................. G01B 7/02
[52] U.S. Cl. ..................................... 33/164 R; 33/166
[58] Field of Search ..................... 33/166, 172 E, 167, 33/164 R, 170, 174 TA; 74/89.15; 318/39

[56] References Cited

U.S. PATENT DOCUMENTS

| | | | |
|---|---|---|---|
| 2,854,755 | 10/1958 | Knobel | 33/147 N |
| 2,933,816 | 4/1960 | Gunther | 33/164 R |
| 2,995,738 | 8/1961 | Masek | 33/166 |
| 3,270,423 | 9/1966 | Birrell et al. | 33/174 TA |
| 3,281,945 | 11/1966 | Frindel | 33/170 |
| 3,289,310 | 12/1960 | Stone | 33/170 |
| 3,555,916 | 1/1971 | Santy | 33/174 TA X |
| 3,996,669 | 12/1976 | Anichini | 33/172 E |

Primary Examiner—Harry N. Haroian
Attorney, Agent, or Firm—St. Onge, Steward, Johnston & Reens

[57] ABSTRACT

A power driven micrometer for engaging a workpiece surface has a rotatable screw and a motor for rotatingly driving the screw. The screw and motor are secured together for longitudinal travel as a unit, the screw being threadedly engaged and supported by a nut in the micrometer casing. A key precludes rotation of the motor relative to the casing while enabling longitudinal travel of the motor relative to the casing.

10 Claims, 4 Drawing Figures

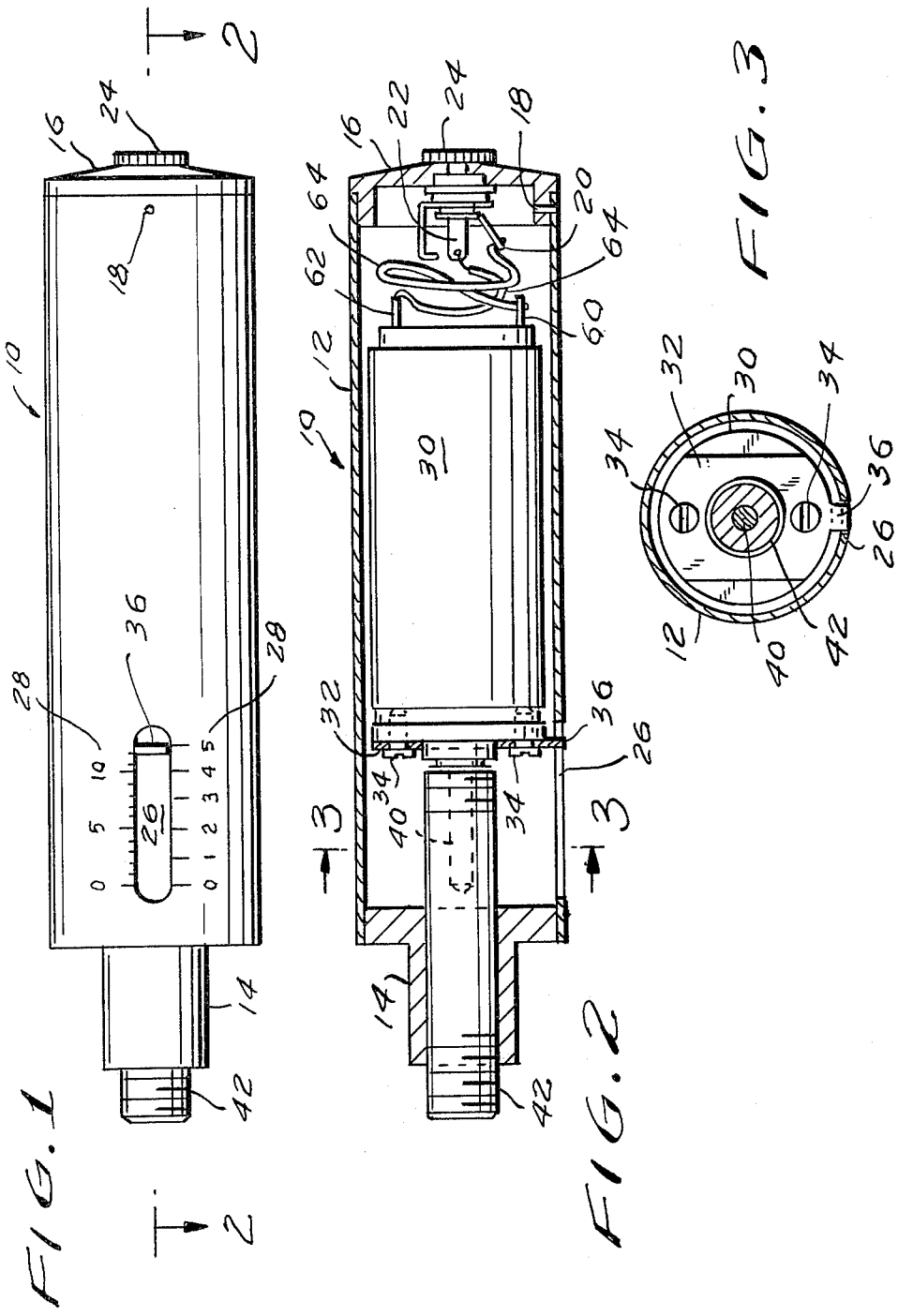

POWER DRIVEN MICROMETER

BACKGROUND OF THE INVENTION

The present invention relates to a positioning device such as a micrometer, and more particularly to a power driven micrometer.

The use of micrometers to move a platform, such as a microscope stage, a precise distance along one or two axes is well known. See, for example, U.S. Pat. Nos. 3,281,945 and 3,555,916. The face of the micrometer spindle or screw is generally flat, with the stage being spring loaded so that contact between the stage and micrometer is maintained as the spindle advances and retreats.

In a number of applications, it is desirable to be able to achieve a micrometer function using a motor drive. This is especially true when the object or workpiece to be positioned is in a remote or inaccessible location. Such power driven micrometers are also well known in the art. See, for example, U.S. Pat. Nos. 2,854,755; 2,995,738, and 3,289,310. Indeed, powered micrometers are known not only for the transverse positioning of a workpiece or stage, but also for the inclining or tilting thereof. See, for example, U.S. Pat. No. 3,270,423.

While generally satisfactory for their purpose, the known power driven micrometers have not proven to be totally satisfactory.

In all of the known power driven micrometers, the motor or other drive means is maintained in a fixed position along the spindle screw or motor shaft axis, while the rotation of the motor shaft or an appended screw means is utilized to effect the desired positioning. This is true regardless of whether the positioning is accomplished by means of the interaction of the micrometer spindle face against a spring-loaded workpiece or stage or whether the positioning is accomplished by means of an interaction between the screw means (secured to the motor shaft) and a nut which is displaced along the screw means axis in response to rotation of the shaft. For example, while the aforementioned U.S. Pat. No. 3,270,423 shows micrometers which are carried on a rotatable member, the position of each micrometer motor along the motor shaft axis of that micrometer is fixed.

In a conventional motor-driven micrometer, the motor shaft is not directly connected to the screw means, but rather the motor shaft is linked to the screw means via a flexible coupling which permits the unit to accommodate bearing run-out and other misalignments without binding. More specifically, the connection between the motor shaft and the screw means typically includes a spline intermediate the screw means and the flexible coupling to accommodate the longitudinal travel of the screw means relative to the flexible coupling and motor shaft. As the motor, motor shaft, flexible coupling, spline and screw means are all disposed along the motor shaft axis, it will be immediately appreciated that the very multitude of parts places a limitation on the degree of micrometer miniaturization available. Furthermore, the use of so many parts increase the difficulty and cost of both the manufacturing and maintenance.

Accordingly, it is an object of the present invention to provide a powered micrometer wherein the motor and screw means are secured together for travel as a unit along the motor shaft axis, without the use of any flexible coupling or spline intermediate the motor shaft and the screw means.

It is another object to provide such a powered micrometer which is capable of enhanced miniaturization due to an improved motor shaft/screw means coupling and which is easy and inexpensive to produce and maintain due to the use of fewer parts.

SUMMARY OF THE INVENTION

It has now been found that the above and related objects of the present invention are obtained by linking the motor and screw together for longitudinal travel as a unit. More particularly, according to the present invention a power driven micrometer for engaging a workpiece surface comprises a support and nut means secured to the support. A rotatable screw means is threadedly engaged by and supported by the nut means, and means are operatively connected to the screw means for rotatingly driving the screw means, the drive means and the screw means further being secured together for longitudinal travel as a unit. Engaging means are operatively secured to the drive means/screw means unit for longitudinal travel therewith and for operatively engaging a workpiece. Keying means are provided for precluding rotation of the drive means relative to the support while enabling longitudinal travel of the drive means relative to the support, so that rotation of the screw means relative to the nut means results in longitudinal travel of the screw means/drive means unit relative to the support.

In a preferred embodiment, the support comprises a casing and the drive means is disposed within the casing. The nut means preferably supports the screw means and drive means with the drive means spaced inwardly from the casing. Typically the casing defines a longitudinal slot therein and the keying means has a first portion secured to the drive means and a second portion adapted to travel longitudinally within the slot and be visible from outside of the casing, thereby to show the relative position of the drive means within the casing.

Generally the keying means comprises a longitudinal slot in the support and a key, the key having a first portion secured to the drive means and a second portion disposed within the slot, thereby to preclude rotation of the drive means. The engaging means may comprise a portion of the keying means adapted to engage the workpiece surface (typically a portion of the keying means extending through and beyond the slot) or a portion of the screw means adapted to engage the workpiece surface.

BRIEF DESCRIPTION OF THE DRAWING

FIG. 1 is a side elevation view of a power driven micrometer of the present invention;

FIG. 2 is a top elevation view, partially in cross-section, taken along the line 2—2 of FIG. 1;

FIG. 3 is an end elevation view, partially in cross-section, taken along the line 3—3 of FIG. 2.

BRIEF DESCRIPTION OF THE PREFERRED EMBODIMENTS

Figure 4:
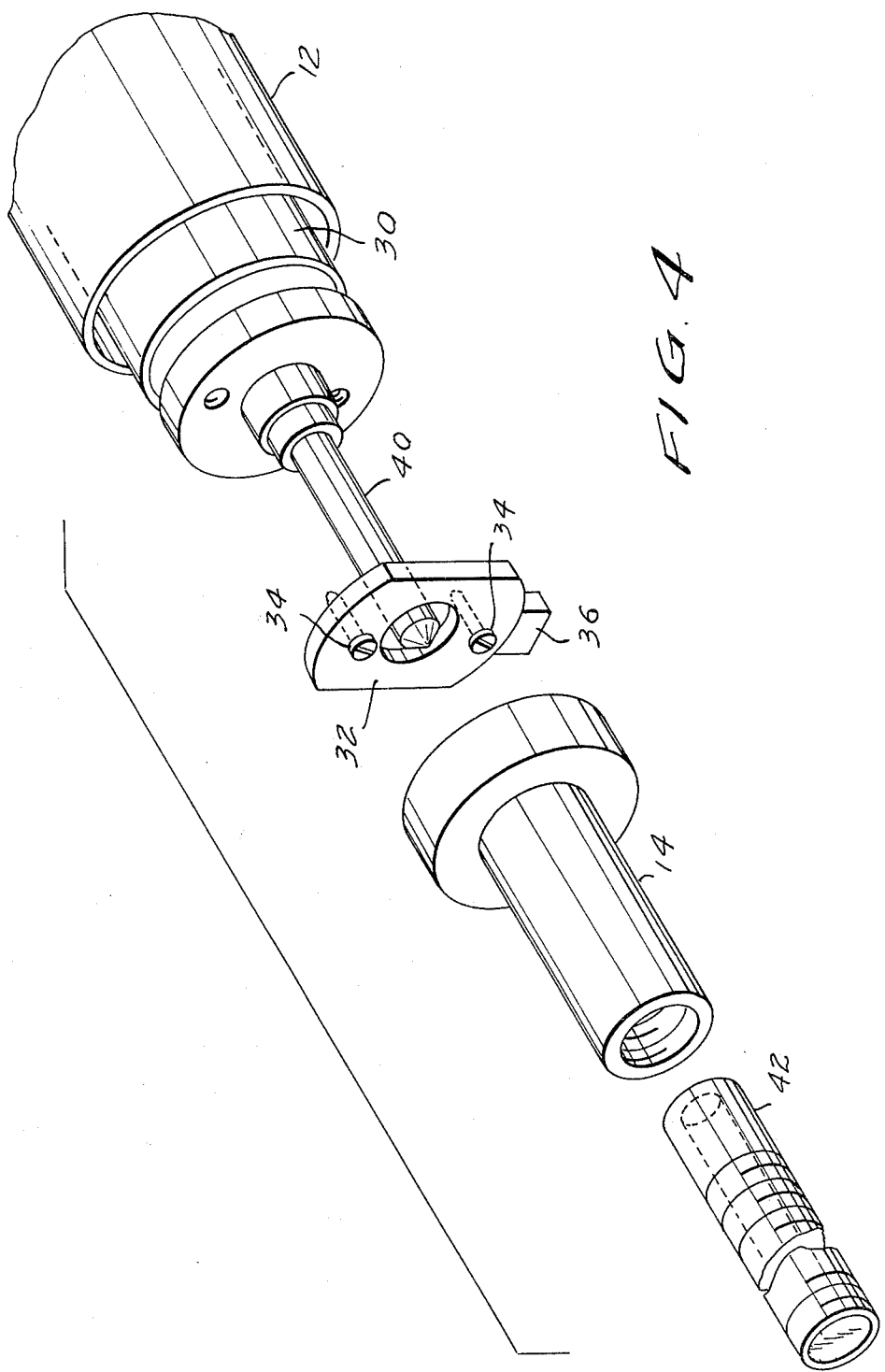
FIG. 4 is a fragmentary exploded isometric, to an enlarged scale, of the micrometer components.
Figure 4:
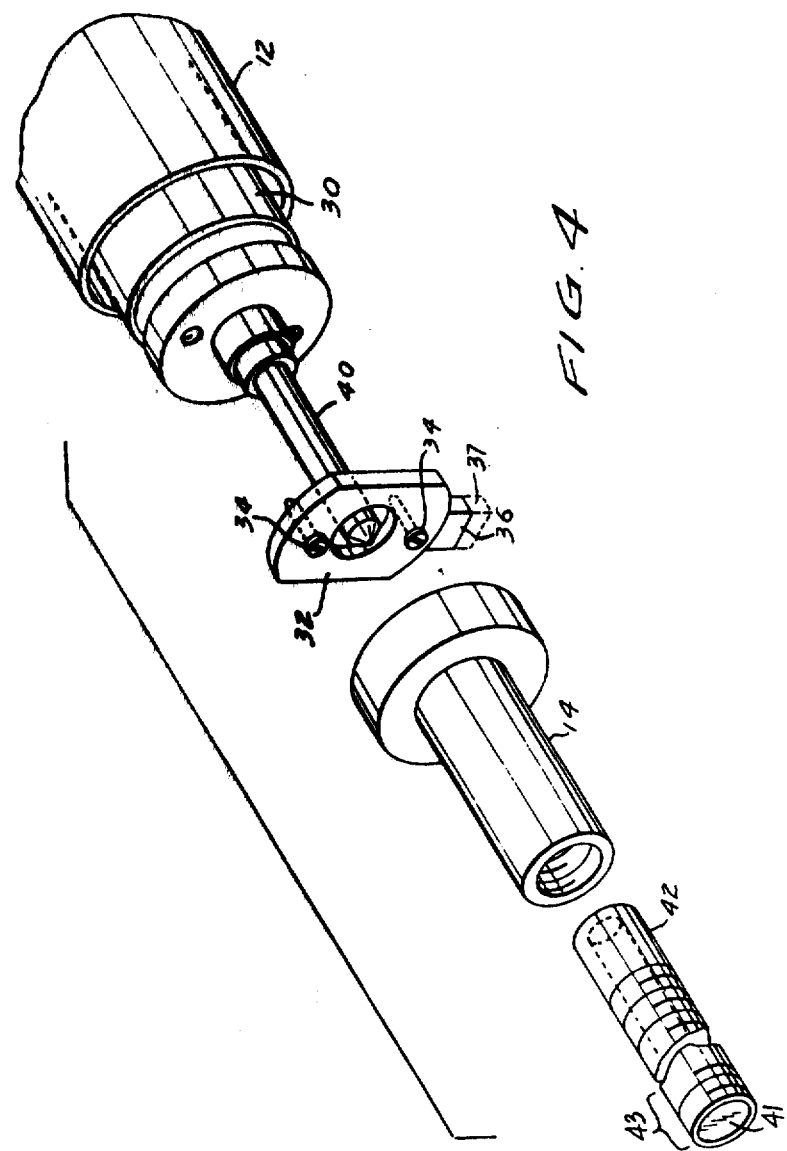

Referring now to the drawing and in particular to FIGS. 1 and 2 thereof, therein illustrated is a power driven micrometer 10 according to the present invention. The micrometer 10 comprises a support such as a hollow cylindrical, longitudinally-extending casing or housing 12. Press-fit or otherwise secured into the front end of the casing 12 is an internally threaded T-shaped nut 14. At the rear end of the casing 12 is an end bell or closure 16 secured thereto by pins 18. The end bell 16 includes on the front thereof a pair of forwardly extending electrical contacts 20, 22 operably connected in a conventional manner to a female plug or connector 24 accessible from the rear of the end bell 16 and adapted to receive a male connector (not shown) for operatively connecting said contacts 20, 22 to a power supply, as desired, to actuate the micrometer 10.

Adjacent to the front end of the casing 12, the casing 12 defines a thin longitudinal slot 26 on the outer surface of the casing 12 and disposed along the length of the slot 26 are a series 28 of indicia, the purpose of which will be explained hereinafter.

Referring now in particular to FIGS. 2–4, disposed within the casing 12 intermediate the end bell 16 and the nut 14 is a motor or other drive mechanism 30 of a type ordinarily used in powered micrometers. Generally a low voltage DC motor which can easily be driven at various speeds is preferred, with particular applications making desirable the use of a motor with an integral gear head or a stepped motor. A key 32 is secured to the front of the motor 30 by a pair of screws 34 (or by other conventional fastening means) and has a tab 36 which extends into the longitudinal slot 26 of the casing 12 and is visible from outside the casing 12. It will be appreciated that the position of the tab 36 relative to the series of indicia 28 on the outer surface of the casing 12 reflects the relative longitudinal position of the motor 30 within the casing 12. As illustrated, the key 32 is simply a rigid planar member of simple configuration having appropriate apertures therein to receive the screws 34 and allow passage of the motor shaft 40 therethrough. To preclude entry of dust into the casing 12, a piece of transparent plastic may be placed over slot 26.

As the rotatable shaft 40 of the motor 30 emerges from the key 32, it is engaged by a rigid screw means 42 featuring a fine pitched external thread adapted to be threadedly engaged by the internal threading of the nut 14 through which it extends. It will be appreciated that the screw means 42 and the motor shaft 40 are secured together for both longitudinal and rotational travel as a unit by any of the conventional means well known in the fastening art.

It will be appreciated that as the nut 14 engages and supports the screw means 42, the nut 14 also supports motor shaft 40 and hence the motor 30. The diameters of the motor 30 and casing 12 are selected so as to enable the outer wall of motor 30 appreciable radially inward clearance from the inner wall of the casing 12. Thus, in effect, the nut 14 supports the motor 30 within, but apart from, the casing 12. The clearance between the motor 30 and the housing or casing 12 is selected to enable the motor 30 to accommodate bearing runout and other misalignments without binding.

Referring now in particular to FIG. 2, the terminals 60, 62 at the rear of the motor 30 are connected to the terminals 20, 22 of the end bell 16 by means of wires 64. The length of each wire 64 is selected so that the entire longitudinal range available within the casing 12, between the nut 14 and the end bell 16, is available to the motor 30 without causing strain, the wires 64 preferably being coiled.

In operation of the electric micrometer 10, a male connector (not shown) is electrically connected to the female connector 24 of the end bell 16. Upon actuation of the male connector, current is transmitted from contacts 20, 22, through wires 64, into motor terminals 60, 62, respectively. Thus actuated, the motor 30 causes rotation of motor shaft 40 and screw means 42, the motor 30 itself being restrained from rotation by the engagement of key tab 36 within the casing longitudinal slot 26. As the screw means 42 rotates relative to the nut 14, it causes longitudinal travel of the motor 30 within the casing 12 equal to the longitudinal travel of the forward face of the screw means 42.

As the screw means 42 is rigidly connected to the motor 30 via the motor shaft 40, the position of the forward face of the screw 42 is directly related to the front end of the motor 30 and hence, with simple calibration, may be directly and easily read using the key tab 36 as a position indicator in connection with indicia 28.

The front face of the screw means 42 may be used as the micrometer spindle, the front face 41 being configured and dimensioned to engage and bear against a workpiece (such as a microscope stage) spring loaded there against. Alternatively, the front portion 43 of the screw means 42 may threadedly engage a gear or pinion, with rotation of the screw means 42 causing rotation of the gear or pinion, and rotation of the gear or pinion in turn being used, through conventional linkages, to adjust the position of a workpiece. If for any reason the front end of the micrometer will be inaccessible or space limitations do not permit the workpiece to be aligned along the screw means/motor shaft axis, a slightly different embodiment of the present invention may be used wherein the key tab 36 is elongated as shown in phantom at reference character 37 so that it not only enters the longitudinal slot 26, but passes therethrough and extends outwardly therefrom sufficiently to directly engage the workpiece itself.

To summarize, the present invention provides a novel powered micrometer which contains fewer parts than a conventional powered micrometer and is thus less expensive to manufacture and assemble, easier to maintain and capable of greater levels of miniaturization. Additionally, the novel micrometer has a simplified and easy-to-read position indicator.

Now that the preferred embodiments of the present invention have been shown and described in detail, various modifications and improvements thereon will become readily apparent to those skilled in the art. Accordingly, the spirit and scope of the present invention is to be limited only by the appended claims and not by the foregoing specification.

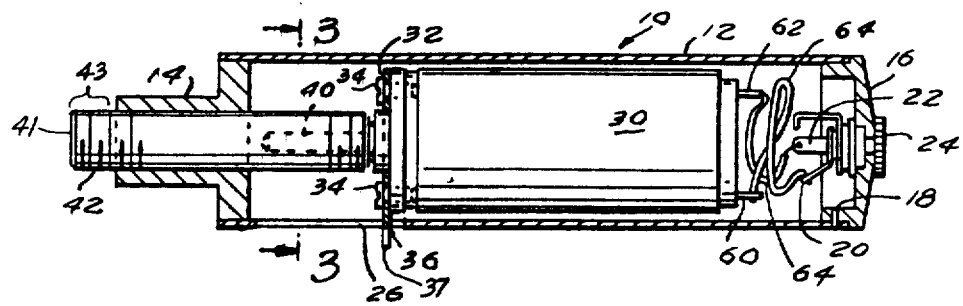

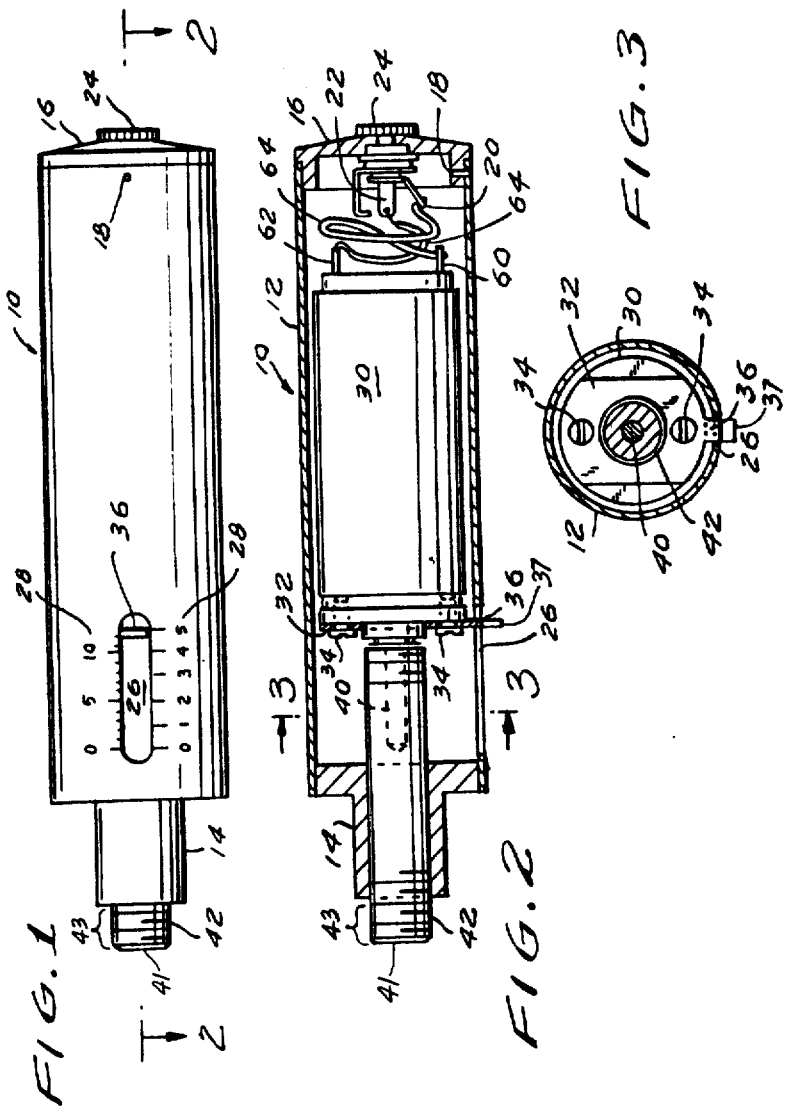

I claim:

1. A power driven micrometer for engaging a workpiece surface comprising:
   (A) a support;
   (B) nut means secured to said support;
   (C) rotatable screw means threadedly engaged by and supported by said nut means;
   (D) means operatively connected to said screw means for rotatingly driving said screw means, said drive means and said screw means being secured together for longitudinal travel as a unit;
   (E) engaging means operatively secured to said unit for longitudinal travel therewith and for operatively engaging said workpiece; and
   (F) keying means for precluding rotation of said drive means relative to said support while enabling longitudinal travel of said drive means relative to said support;

whereby rotation of said screw means relative to said nut means results in longitudinal travel of said screw means/drive means unit relative to said support.

2. The micrometer of claim 1, wherein said support comprises a casing and said drive means is disposed within said casing.

3. The micrometer of claim 2, wherein said nut means supports said screw means and drive means with said drive means spaced inwardly from said casing.

4. The micrometer of claim 2, wherein said casing defines a longitudinal slot therein and wherein said keying means has a first portion secured to said drive means and a second portion adapted to travel longitudinally within said slot and be visible from outside of said casing, thereby to show the relative position of said drive means within said casing.

5. The micrometer of claim 1, wherein said keying means comprises a longitudinal slot in said support and a key, said key having a first portion secured to said drive means and a second portion disposed within said slot, thereby to preclude rotation of said drive means.

6. The micrometer of claim 5, wherein said engaging means comprises a portion of said keying means extending through and beyond said slot to engage the workpiece surface.

7. The micrometer of claim 1, wherein said engaging means comprises a portion of said screw means adapted to engage the workpiece surface.

8. The micrometer of claim 1, wherein said engaging means comprises a portion of said keying means adapted to engage the workpiece surface.

9. The micrometer of claim 1, wherein said drive means comprises a motor.

10. A power driven micrometer for engaging a work piece comprising:
a housing having a threaded aperture receiving and engaging screw means;
drive means for rotating said screw means, said drive means being secured to said screw means for longitudinal travel as a unit in said housing;
means for engaging said workpiece operatively secured with respect to said unit for longitudinal travel therewith; and
means for precluding rotation of said drive means relative to said housing while enabling longitudinal travel of said drive means relative to said support to provide longitudinal travel of said engaging means upon rotation of said screw means.

* * * * *

UNITED STATES PATENT AND TRADEMARK OFFICE
CERTIFICATE OF CORRECTION

PATENT NO. : 4,335,516

DATED : June 22, 1982

INVENTOR(S) : Arthur Edelstein

It is certified that error appears in the above-identified patent and that said Letters Patent is hereby corrected as shown below:

The title page should be deleted to appear as per attached title page.

The sheets of drawings containing Figures 1 -4 should be deleted to appear as per attached sheets.

Signed and Sealed this

Twentieth Day of November 1984

[SEAL]

Attest:

GERALD J. MOSSINGHOFF

Attesting Officer

Commissioner of Patents and Trademarks

United States Patent [19]

Edelstein

[11] 4,335,516
[45] Jun. 22, 1982

[54] POWER DRIVEN MICROMETER

[75] Inventor: Arthur Edelstein, Jamaica, N.Y.

[73] Assignee: Oriel Corporation, Stamford, Conn.

[21] Appl. No.: 133,636

[22] Filed: Mar. 24, 1980

[51] Int. Cl.³ .............................................. G01B 7/02
[52] U.S. Cl. ................................. 33/164 R; 33/166
[58] Field of Search ................... 33/166, 172 E, 167, 33/164 R, 170, 174 TA; 74/89.15; 318/39

[56] References Cited

U.S. PATENT DOCUMENTS

| | | | |
|---|---|---|---|
| 2,854,755 | 10/1958 | Knobel | 33/147 N |
| 2,933,816 | 4/1960 | Gunther | 33/164 R |
| 2,995,738 | 8/1961 | Masek | 33/166 |
| 3,270,423 | 9/1966 | Birrell et al. | 33/174 TA |
| 3,281,945 | 11/1966 | Frindel | 33/170 |
| 3,289,310 | 12/1960 | Stone | 33/170 |
| 3,555,916 | 1/1971 | Santy | 33/174 TA X |
| 3,996,669 | 12/1976 | Anichini | 33/172 E |

Primary Examiner—Harry N. Haroian
Attorney, Agent, or Firm—St. Onge, Steward, Johnston & Reens

[57] ABSTRACT

A power driven micrometer for engaging a workpiece surface has a rotatable screw and a motor for rotatingly driving the screw. The screw and motor are secured together for longitudinal travel as a unit, the screw being threadedly engaged and supported by a nut in the micrometer casing. A key precludes rotation of the motor relative to the casing while enabling longitudinal travel of the motor relative to the casing.

10 Claims, 4 Drawing Figures